United States Patent
McMahon

(10) Patent No.: US 11,702,241 B2
(45) Date of Patent: Jul. 18, 2023

(54) PLASTIC CORRUGATED CONTAINER WITH SEALED EDGES

(71) Applicant: ORBIS Corporation, Oconomowoc, WI (US)

(72) Inventor: William F. McMahon, Hartford, WI (US)

(73) Assignee: ORBIS Corporation, Oconomowoc, WI (US)

( * ) Notice: Subject to any disclaimer, the term of this patent is extended or adjusted under 35 U.S.C. 154(b) by 227 days.

(21) Appl. No.: 16/296,540

(22) Filed: Mar. 8, 2019

(65) Prior Publication Data

US 2019/0270542 A1    Sep. 5, 2019

Related U.S. Application Data

(63) Continuation of application No. 14/265,977, filed on Apr. 30, 2014, now Pat. No. 10,252,832, which is a
(Continued)

(51) Int. Cl.
*B65D 5/42* (2006.01)
*B65D 65/40* (2006.01)
(Continued)

(52) U.S. Cl.
CPC ............ *B65D 5/4279* (2013.01); *B29C 53/06* (2013.01); *B29C 53/063* (2013.01); *B29C 65/18* (2013.01);
(Continued)

(58) Field of Classification Search
CPC ..... B29C 53/06; B29C 53/063; B29C 66/431; B29C 66/723; B29C 66/7252;
(Continued)

(56) References Cited

U.S. PATENT DOCUMENTS

| 1,101,927 A | 6/1914 | Hawkins et al. |
| 1,733,566 A | 10/1929 | Weaver |

(Continued)

FOREIGN PATENT DOCUMENTS

| CA | 2935978 A1 | 4/2013 |
| CA | 2961959 A1 | 4/2016 |

(Continued)

OTHER PUBLICATIONS

European Patent Office, Communication pursuant to Article 94(3) EPC for European Application No. 17816258.2, dated Jul. 24, 2020, 5 pages.

(Continued)

*Primary Examiner* — Derek J Battisti
(74) *Attorney, Agent, or Firm* — Greensfelder, Hemker & Gale, P.C.; Richard C. Himelhoch

(57) ABSTRACT

A reusable plastic container is provided. The container includes a plastic container body having opposing side panels and opposing end panels. The container body also includes top side panel flaps attached to a top portion of each side panel, and bottom side panel flaps attached to a bottom portion of each side panel. The container body has top end panel flaps attached to a top portion of each end panel, and bottom end panel flaps attached to a bottom portion of each end panel. The top and bottom side panel flaps are each defined with respect to the side panels by a fold line. The fold lines including at least one scored portion and at least one welded portion.

19 Claims, 5 Drawing Sheets

Related U.S. Application Data continuation of application No. 13/273,019, filed on Oct. 13, 2011, now Pat. No. 8,864,017.

(51) Int. Cl.
| | |
|---|---|
| *B29C 65/18* | (2006.01) |
| *B29C 65/00* | (2006.01) |
| *B29C 53/06* | (2006.01) |
| *B65D 5/02* | (2006.01) |
| B29L 31/00 | (2006.01) |
| B29C 65/30 | (2006.01) |

(52) U.S. Cl.
CPC .......... *B29C 66/1122* (2013.01); *B29C 66/21* (2013.01); *B29C 66/431* (2013.01); *B29C 66/723* (2013.01); *B29C 66/7252* (2013.01); *B29C 66/81423* (2013.01); *B29C 66/81425* (2013.01); *B29C 66/81427* (2013.01); *B29C 66/81431* (2013.01); *B29C 66/8322* (2013.01); *B65D 5/0227* (2013.01); *B65D 5/42* (2013.01); *B65D 5/4266* (2013.01); *B65D 65/403* (2013.01); *B29C 65/305* (2013.01); *B29C 66/81422* (2013.01); *B29C 66/91423* (2013.01); *B29L 2031/7162* (2013.01); *B65D 2301/20* (2013.01); *Y02W 30/80* (2015.05); *Y10S 229/93* (2013.01)

(58) Field of Classification Search
CPC ........ B29C 66/81423; B29C 66/81425; B29C 66/81427; B29C 66/81431; B29C 66/8322; B65D 5/4266
See application file for complete search history.

(56) References Cited

U.S. PATENT DOCUMENTS

| | | | |
|---|---|---|---|
| 2,533,773 A | 12/1950 | De La Foret | |
| 2,751,136 A | 6/1956 | Moore | |
| 3,199,763 A | 8/1965 | Anderson | |
| 3,203,288 A | 8/1965 | Blumer | |
| 3,349,446 A | 10/1967 | Haygeman | |
| 3,350,492 A | 10/1967 | Grootenboer | |
| 3,406,052 A | 10/1968 | Peters | |
| 3,414,184 A | 12/1968 | Loheed | |
| 3,562,041 A | 2/1971 | Robertson | |
| 3,611,884 A | 10/1971 | Hottendorf | |
| 3,635,451 A | 1/1972 | Wagner | |
| 3,687,170 A * | 8/1972 | Malone ................ | B29C 53/063 |
| | | | 138/143 |
| 3,727,825 A | 4/1973 | Troth | |
| 3,727,826 A | 4/1973 | Shepherd | |
| 3,768,724 A | 10/1973 | Hill | |
| 3,796,307 A | 3/1974 | McKinney | |
| 3,883,065 A | 5/1975 | Presnick | |
| 3,884,132 A | 5/1975 | Snodgrass | |
| 3,900,550 A | 8/1975 | Oliver et al. | |
| 3,907,193 A * | 9/1975 | Heller ................... | B29C 53/063 |
| | | | 428/156 |
| 3,929,536 A | 12/1975 | Maughan | |
| 3,973,721 A | 8/1976 | Nakane | |
| 3,977,310 A | 8/1976 | Keck et al. | |
| 3,981,213 A | 9/1976 | Lopman | |
| 4,011,798 A | 3/1977 | Bambara et al. | |
| 4,027,058 A | 5/1977 | Wootten | |
| 4,064,206 A | 12/1977 | Seufert | |
| 4,090,903 A | 5/1978 | Matsui | |
| 4,106,623 A | 8/1978 | Carroll et al. | |
| 4,121,754 A * | 10/1978 | Hackenberg ......... | B65D 5/0254 |
| | | | 229/151 |
| 4,239,150 A | 12/1980 | Schadowski et al. | |
| 4,267,223 A | 5/1981 | Swartz | |
| 4,313,547 A | 2/1982 | Osborne | |
| 4,348,449 A | 9/1982 | Seufert | |
| 4,353,495 A | 10/1982 | Jes | |
| 4,356,053 A | 10/1982 | LoMaglio | |
| 4,358,498 A | 11/1982 | Chavannes | |
| 4,415,515 A | 11/1983 | Rosenberg | |
| 4,441,948 A | 4/1984 | Gillard et al. | |
| 1,477,013 A | 10/1984 | Herrin | |
| 4,477,522 A | 10/1984 | Sheehan | |
| 4,482,417 A | 11/1984 | Hulber et al. | |
| 4,507,348 A | 3/1985 | Nagata et al. | |
| 4,515,648 A | 5/1985 | Kolbe et al. | |
| 4,517,790 A | 5/1985 | Kreager | |
| 4,530,196 A | 7/1985 | O'Bryan | |
| 4,535,929 A * | 8/1985 | Sherman, II .......... | B65D 5/103 |
| | | | 206/459.5 |
| 4,559,259 A | 12/1985 | Cetrelli | |
| 4,596,541 A | 6/1986 | Ward, Sr. et al. | |
| 4,601,407 A | 7/1986 | Gillard | |
| 4,604,083 A | 8/1986 | Barny et al. | |
| 4,605,454 A | 8/1986 | Sayovitz et al. | |
| 4,623,072 A | 11/1986 | Lorenz | |
| 4,655,389 A * | 4/1987 | Marsh .................... | B65D 5/62 |
| | | | 229/183 |
| 4,733,916 A | 3/1988 | Seufert | |
| 4,767,393 A | 8/1988 | Smith | |
| 4,784,269 A | 11/1988 | Griffith | |
| 4,865,201 A | 9/1989 | Liebel | |
| 4,906,510 A | 3/1990 | Todor, Jr. et al. | |
| 4,938,413 A | 7/1990 | Wolfe | |
| 4,946,430 A | 8/1990 | Kohmann | |
| 4,948,039 A | 8/1990 | Amatangelo | |
| 4,960,207 A | 10/1990 | Tabler et al. | |
| 5,012,930 A * | 5/1991 | Hansen .................. | B65D 5/18 |
| | | | 229/152 |
| 5,021,042 A | 6/1991 | Resnick et al. | |
| 5,054,265 A | 10/1991 | Perigo et al. | |
| 5,114,034 A * | 5/1992 | Miller ................... | B65D 1/225 |
| | | | 220/62 |
| 5,158,525 A | 10/1992 | Nikkel | |
| 5,163,609 A | 11/1992 | Muise, Jr. | |
| 5,183,672 A | 2/1993 | Fetterhoff et al. | |
| 5,190,213 A | 3/1993 | Horwitz | |
| 5,202,065 A | 4/1993 | Lenander et al. | |
| 5,232,149 A | 8/1993 | Stoll | |
| 5,255,842 A | 10/1993 | Rosen | |
| 5,268,138 A | 12/1993 | Fetterhoff et al. | |
| 5,304,056 A | 4/1994 | Fetterhoff | |
| 5,325,602 A | 7/1994 | Nainis et al. | |
| 5,340,632 A | 8/1994 | Chappuis | |
| 5,351,846 A | 10/1994 | Carter | |
| 5,356,696 A | 10/1994 | Fetterhoff | |
| 5,384,002 A * | 1/1995 | Leatherman ........ | B29C 66/0044 |
| | | | 156/198 |
| 5,466,211 A | 11/1995 | Komarek et al. | |
| 5,497,939 A * | 3/1996 | Heiskell ............. | B65D 11/1893 |
| | | | 229/122.24 |
| 5,501,758 A | 3/1996 | Nitardy | |
| 5,503,324 A | 4/1996 | Bacchetti et al. | |
| 5,533,956 A | 7/1996 | Komarek et al. | |
| 5,564,623 A | 10/1996 | Kiley | |
| 5,597,111 A | 1/1997 | Mackinnon et al. | |
| 5,658,644 A | 8/1997 | Ho et al. | |
| 5,681,422 A | 10/1997 | Marschke | |
| 5,733,411 A | 3/1998 | Bett | |
| 5,765,688 A | 6/1998 | Bertram et al. | |
| 5,873,807 A | 2/1999 | Lauderbaugh et al. | |
| 5,878,554 A | 3/1999 | Loree et al. | |
| 5,881,902 A | 3/1999 | Ackermann | |
| 5,887,782 A | 3/1999 | Mueller | |
| 5,908,135 A | 6/1999 | Bradford et al. | |
| 5,913,766 A | 6/1999 | Reed et al. | |
| 5,924,627 A | 7/1999 | Wilder et al. | |
| 5,944,252 A | 8/1999 | Connelly et al. | |
| 5,965,238 A | 10/1999 | Saitoh et al. | |
| 6,007,470 A | 12/1999 | Komarek et al. | |
| 6,039,101 A | 3/2000 | MacKinnon | |
| 6,056,840 A | 5/2000 | Mills et al. | |
| 6,071,225 A | 6/2000 | Kucharski | |
| 6,102,279 A | 8/2000 | Dowd | |

(56) References Cited

U.S. PATENT DOCUMENTS

| | | |
|---|---|---|
| 6,102,280 A | 8/2000 | Dowd |
| 6,120,629 A | 9/2000 | Shannon et al. |
| 6,138,903 A | 10/2000 | Baker |
| 6,159,137 A | 12/2000 | Lee et al. |
| 6,203,482 B1 | 3/2001 | Sandford |
| 6,228,234 B1 | 5/2001 | Oshima et al. |
| 6,257,484 B1 | 7/2001 | Dowd |
| 6,338,234 B1 | 1/2002 | Muise et al. |
| 6,349,876 B1 | 2/2002 | Dowd |
| 6,450,398 B1 | 9/2002 | Muise et al. |
| 6,572,519 B1 | 6/2003 | Harris |
| 6,578,759 B1 | 6/2003 | Ortiz |
| 6,592,711 B1 | 7/2003 | Kubik |
| 6,655,434 B2 | 12/2003 | Danko |
| 6,676,010 B1 | 1/2004 | Roseth et al. |
| 6,689,033 B2 | 2/2004 | Plemons et al. |
| 6,705,515 B2 | 3/2004 | Dowd |
| 6,719,191 B1 | 4/2004 | Christensen et al. |
| 6,759,114 B2 | 7/2004 | Wu et al. |
| 6,761,307 B2 | 7/2004 | Matsuoka |
| 6,769,548 B2 | 8/2004 | Morell et al. |
| 6,902,103 B2 | 6/2005 | Machery |
| 6,926,192 B1 | 8/2005 | Dowd |
| 6,938,818 B2 | 9/2005 | Moorman et al. |
| 6,994,662 B2 | 2/2006 | Jornborn et al. |
| 7,025,841 B2 | 4/2006 | Owen |
| 7,028,834 B2 | 4/2006 | Karpel |
| 7,069,856 B2 | 7/2006 | Hartka et al. |
| 7,326,168 B2 | 2/2008 | Kocherga et al. |
| 7,384,497 B2 | 6/2008 | Christensen et al. |
| 7,452,316 B2 | 11/2008 | Cals et al. |
| D608,634 S | 1/2010 | Riedi |
| 7,640,662 B2 | 1/2010 | Haglid |
| 7,670,275 B2 | 3/2010 | Schaack |
| 7,682,300 B2 | 3/2010 | Graham et al. |
| 7,726,480 B2 | 6/2010 | Nazari |
| 7,784,674 B2 | 8/2010 | Grigsby |
| 7,870,992 B2 | 1/2011 | Schille et al. |
| 7,886,503 B2 | 2/2011 | Chase et al. |
| 7,951,252 B2 | 5/2011 | Danko |
| 8,418,912 B1 | 4/2013 | Goodrich |
| 8,662,133 B2 | 3/2014 | Ninomiya et al. |
| 8,662,378 B2 | 3/2014 | Mehta |
| 8,864,017 B2 | 10/2014 | McMahon |
| 9,126,711 B2 | 9/2015 | Hermosillo et al. |
| 9,302,806 B2 | 4/2016 | Perkins |
| 9,555,918 B2 | 1/2017 | McMahon |
| 9,573,722 B1 | 2/2017 | Capogrosso |
| 9,604,750 B2 | 3/2017 | McMahon et al. |
| 9,630,736 B2 | 4/2017 | Oliveira |
| 9,630,739 B2 | 4/2017 | McMahon et al. |
| 10,199,811 B2 | 2/2019 | Chu et al. |
| 10,392,153 B2 | 8/2019 | Mehta |
| 10,583,955 B2 | 3/2020 | Ackroyd et al. |
| 10,625,916 B2 | 4/2020 | Balazs |
| 2001/0022211 A1 | 9/2001 | Walsh |
| 2001/0027992 A1 | 10/2001 | Strong |
| 2001/0046584 A1 | 11/2001 | Danko |
| 2002/0007607 A1 | 1/2002 | Matlack et al. |
| 2002/0011513 A1 | 1/2002 | Dowd |
| 2002/0026742 A1 | 3/2002 | Washington |
| 2002/0125594 A1 | 9/2002 | Sung et al. |
| 2003/0010817 A1 | 1/2003 | Lingle et al. |
| 2003/0102361 A1 | 6/2003 | Terashima et al. |
| 2003/0127773 A1 | 7/2003 | Feistel et al. |
| 2003/0215613 A1 | 11/2003 | Jan et al. |
| 2003/0235660 A1 | 12/2003 | Blanchard |
| 2004/0222542 A1 | 11/2004 | Jan et al. |
| 2004/0248717 A1 | 12/2004 | Calugi |
| 2005/0006446 A1 | 1/2005 | Stafford, Jr. |
| 2005/0067084 A1* | 3/2005 | Kagan ............... B29C 66/12461 156/64 |
| 2005/0067477 A1 | 3/2005 | McClure |
| 2005/0150244 A1 | 7/2005 | Hillmann et al. |
| 2005/0202215 A1 | 9/2005 | Temple, II et al. |
| 2005/0209076 A1 | 9/2005 | Boutron et al. |
| 2006/0089071 A1 | 4/2006 | Leidig et al. |
| 2006/0169757 A1 | 8/2006 | McDowell |
| 2007/0069428 A1 | 3/2007 | Pfaff et al. |
| 2007/0228129 A1 | 10/2007 | Habeger, Jr. et al. |
| 2007/0241900 A1 | 10/2007 | Sasazaki |
| 2007/0296890 A1* | 12/2007 | Mizushima ......... B29C 66/1284 349/96 |
| 2008/0003869 A1 | 1/2008 | Wu et al. |
| 2008/0003870 A1 | 1/2008 | Wu et al. |
| 2008/0048367 A1 | 2/2008 | Falat |
| 2008/0247682 A1 | 10/2008 | Murray |
| 2009/0011173 A1 | 1/2009 | Thiagarajan |
| 2009/0280973 A1 | 11/2009 | Graham et al. |
| 2010/0078466 A1* | 4/2010 | Stack, Jr. ............. B65D 81/075 229/120.38 |
| 2010/0105534 A1 | 4/2010 | Nazari |
| 2010/0147840 A1 | 6/2010 | Dowd |
| 2010/0155460 A1 | 6/2010 | Mehta |
| 2011/0069911 A1* | 3/2011 | Ackerman ............ A45C 11/20 383/64 |
| 2011/0101081 A1* | 5/2011 | Dowd .................. B65D 5/0281 229/193 |
| 2011/0303740 A1* | 12/2011 | Schuld ............... B65D 5/48014 229/160.1 |
| 2012/0118880 A1 | 5/2012 | Wnek |
| 2013/0048704 A1 | 2/2013 | Lewis et al. |
| 2013/0055407 A1 | 4/2013 | McMahon |
| 2013/0092726 A1 | 4/2013 | McMahon |
| 2014/0231496 A1 | 8/2014 | McMahon |
| 2014/0231497 A1 | 8/2014 | McMahon |
| 2014/0367458 A1 | 12/2014 | Smith |
| 2014/0367459 A1 | 12/2014 | Smith |
| 2014/0374303 A1 | 12/2014 | Martinez |
| 2015/0174849 A1 | 6/2015 | McMahon et al. |
| 2015/0174850 A1 | 6/2015 | McMahon et al. |
| 2015/0175297 A1 | 6/2015 | McMahon et al. |
| 2015/0175298 A1 | 6/2015 | McMahon et al. |
| 2015/0210421 A1 | 7/2015 | Whittles et al. |
| 2016/0096651 A1 | 4/2016 | Klein |
| 2016/0102196 A1 | 4/2016 | Dodd |
| 2017/0066214 A1 | 3/2017 | Polikov |
| 2017/0291731 A1 | 10/2017 | Balazs et al. |
| 2017/0369221 A1 | 12/2017 | Balazs |
| 2018/0105316 A1 | 4/2018 | McMahon et al. |
| 2018/0362207 A1 | 12/2018 | McMahon et al. |
| 2019/0270542 A1 | 9/2019 | McMahon |
| 2019/0300210 A1 | 10/2019 | Ponti |

FOREIGN PATENT DOCUMENTS

| | | |
|---|---|---|
| CA | 2851357 C | 8/2016 |
| CA | 3028971 A1 | 12/2017 |
| DE | 9110957 U1 | 11/1991 |
| DE | 102010041663 A1 | 3/2012 |
| EP | 0054856 A1 | 6/1982 |
| EP | 0330228 A2 | 8/1989 |
| EP | 0330228 A3 | 8/1989 |
| EP | 0399657 A1 | 11/1990 |
| EP | 0459672 A1 | 12/1991 |
| EP | 0535998 A1 | 4/1993 |
| EP | 0566338 A1 | 10/1993 |
| EP | 0731233 A1 | 9/1996 |
| EP | 1488912 A1 | 12/2004 |
| EP | 1880947 A2 | 1/2008 |
| EP | 1787801 B1 | 8/2009 |
| EP | 1799432 B1 | 1/2010 |
| EP | 2766269 | 8/2014 |
| EP | 2766269 B1 | 12/2016 |
| EP | 3170759 A1 | 5/2017 |
| EP | 3170760 A1 | 5/2017 |
| EP | 3089917 B1 | 6/2018 |
| EP | 3486188 A1 | 5/2019 |
| EP | 3865415 A1 | 8/2021 |
| GB | 1593730 A | 7/1981 |
| GB | 2199017 A | 6/1988 |
| GB | 2249520 A | 5/1992 |
| GB | 2271095 A | 4/1994 |

(56) References Cited

FOREIGN PATENT DOCUMENTS

| | | |
|---|---|---|
| GB | 2276120 A | 9/1994 |
| GB | 2299048 A | 9/1996 |
| JP | S597014 A | 1/1984 |
| JP | 3266630 A | 11/1991 |
| JP | 5146996 A | 6/1993 |
| JP | 08-085148 A | 4/1996 |
| JP | 2003340936 A | 5/2002 |
| JP | 2003062917 A | 3/2003 |
| JP | 2003104361 | 4/2003 |
| JP | 2005343554 A | 12/2005 |
| JP | 2006001136 A | 1/2006 |
| JP | 2009006556 A | 1/2009 |
| KR | 20020006235 A | 1/2002 |
| KR | 20100137130 A | 12/2010 |
| KR | 10-2016-0054489 | 5/2016 |
| MX | 9503047 A | 2/1997 |
| MX | 343734 B | 11/2016 |
| MX | 2017004472 A | 6/2017 |
| MX | 353612 B | 1/2018 |
| MX | 364678 B | 5/2019 |
| TW | 356126 | 4/1999 |
| TW | 416925 B | 1/2001 |
| TW | 200619094 | 6/2006 |
| TW | 306060 B | 2/2009 |
| TW | 201345796 A | 11/2013 |
| TW | I555683 B | 11/2016 |
| TW | 201716293 A | 5/2017 |
| TW | 201716294 A | 5/2017 |
| TW | I600591 B | 10/2017 |
| TW | I600592 B | 10/2017 |
| WO | 9309032 A1 | 5/1993 |
| WO | 2005120965 A1 | 12/2005 |
| WO | 2006034502 A1 | 3/2006 |
| WO | 2007105964 A1 | 9/2009 |
| WO | 2010049880 A2 | 5/2010 |
| WO | 2012055429 A1 | 5/2012 |
| WO | 2013055407 A1 | 4/2013 |
| WO | 2015100249 A2 | 7/2015 |
| WO | 2016057256 A1 | 4/2016 |
| WO | 2017223392 A1 | 12/2017 |
| WO | 2018156604 A1 | 8/2018 |
| WO | 2018236801 A1 | 12/2018 |

OTHER PUBLICATIONS

European Patent Office, Communication pursuant to Rule 164(1) EPC, Partial Supplementary European Search Report for EP 18821166.8, dated Feb. 23, 2021, 12 pages.
The International Bureau of WIPO, International Preliminary Report on Patentability for PCT/US2012/038316, dated Apr. 15, 2014, 9 pages.
European Patent Office, Extended European Search Report for EP 18174415.2, dated Mar. 26, 2019, 7 pages.
European Patent Office, International Search Report for PCT/US2012/038316, dated Aug. 2, 2012, 5 pages.
European Patent Office, Extended European Search Report for EP 15849285.0, dated Feb. 7, 2018, 8 pages.
European Patent Office, Written Opinion of International Searching Authority for PCT/US2012/038316, dated Aug. 2, 2012, 8 pages.
European Patent Office, Extended European Search Report for EP Application No. 18821166.8, dated May 28, 2021, 10 pages.
European Patent Office, Extended European Search Report for EP Application No. 21166046.9, dated Jun. 30, 2021, 7 pages.
Tri-Pack Plastics Ltd.; Web pages for "Chilled Foods," "Polypropylene Packaging," "Tree Tubes," "Transit Packaging," and "Returnable Post"; retrieved Jan. 18, 2010 from <http://www.tri-pack.co.uk/> and related sites, 9 pages.
Wikipedia article: "Corrugated Fiberboard"; retrieved from <http://en.wikipedia.org/w/index.php?title=Corrugated_fiberboard&oldid=648589914> on Mar. 3, 2015, 7 pages.
European Patent Office, Partial International Search Report for PCT/US2014/071926 dated Apr. 28, 2015, 5 pages.
European Patent Office, International Search Report for PCT/US2014/071926 dated Jun. 30, 2015, 6 pages.
Taiwanese Patent Office, Search Report for Taiwanese Application No. 101137741, dated Jun. 23, 2016, 1 page, with English translation.
European Patent Office, Extended European Search Report for EP 16204731.0, dated Feb. 3, 2017, 9 pages.
European Patent Office, Extended European Search Report for EP 16204728.6, dated Feb. 3, 2017, 10 pages.
Taiwanese Intellectual Property Office, Office Action and Search Report for TW Application No. 105123775, dated Mar. 8, 2017, with English translation, 5 pages.
Taiwanese Intellectual Property Office, Office Action and Search Report for TW Application No. 105123777, dated Mar. 8, 2017, with English translation, 5 pages.
European Patent Office, Written Opinion of the International Searching Authority for PCT/US2014/071926, dated Jun. 30, 2015, 6 pages.
The International Bureau of WIPO, International Preliminary Report on Patentability for PCT/US2014/071926, dated Jun. 28, 2016, 7 pages.
The International Bureau of WIPO, International Preliminary Report on Patentability for PCT/US2015/052618, dated Apr. 11, 2017, 5 pages.
Russia's Federal Institute of Industrial Property, Written Opinion of the International Searching Authority for PCT/US2015/052618, dated Feb. 18, 2016, 4 pages.
Russia's Federal Institute of Industrial Property, International Search Report for PCT/US2015/052618, dated Feb. 18, 2016, 2 pages.
European Patent Office; Communication Pursuant to Article 94(3) EPC for EP 14825566.4, dated Dec. 2, 2017, 5 pages.
Taiwanese Intellectual Property Office, Office Action and Search Report for TW Application No. 104132707, dated Jan. 24, 2019, with English translation, 9 pages.
Korean Intellectual Property Office, International Search Report for PCT/US2017/038912, dated Oct. 27, 2017, 3 pages.
Korean Intellectual Property Office, Written Opinion of the International Searching Authority for PCT/US2017/038912, dated Oct. 27, 2017, 9 pages.
The International Bureau of WIPO, International Preliminary Report on Patentability for PCT/US2017/038912, dated Dec. 25, 2018, 10 pages.
Korean Intellectual Property Office, International Search Report for PCT/US2018/018983, dated Jun. 21, 2018, 5 pages.
Korean Intellectual Property Office, Written Opinion of the International Searching Authority for PCT/US2018/018983, dated Jun. 21, 2018, 8 pages.
Korean Intellectual Property Office, International Search Report for PCT/US2018/038182, dated Oct. 17, 2018, 3 pages.
Korean Intellectual Property Office, Written Opinion of the International Searching Authority for PCT/US2018/038182, dated Oct. 17, 2018, 6 pages.
European Patent Office, Extended European Search Report for EP 17816258.2, dated Oct. 18, 2019, 12 pages.
European Patent Office, Communication pursuant to Article 94(3) EPC for EP 15849285.0, dated Nov. 18, 2019, 6 pages.

* cited by examiner

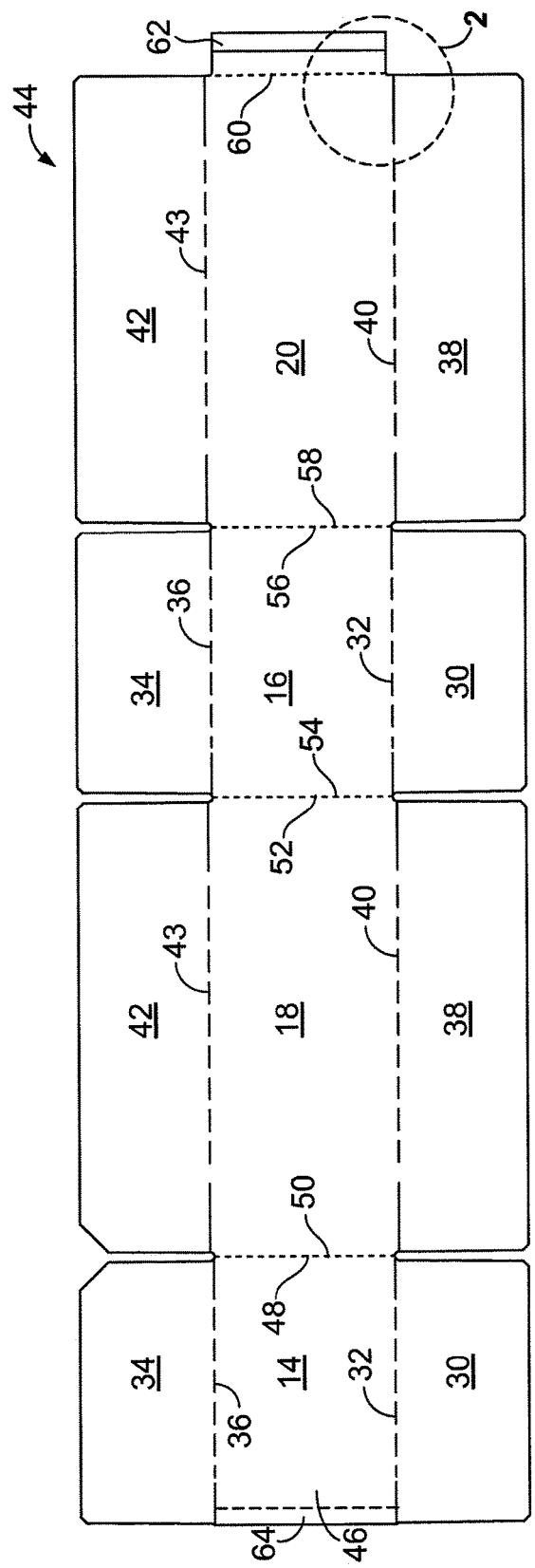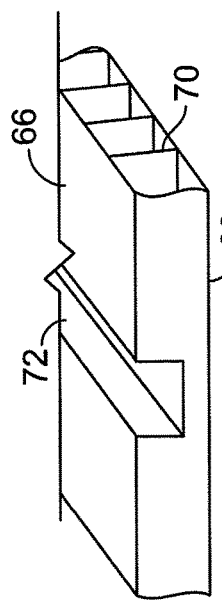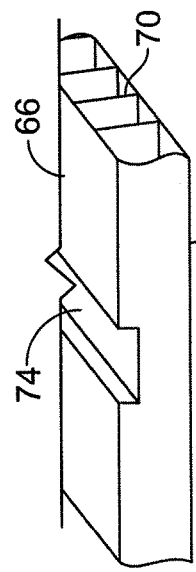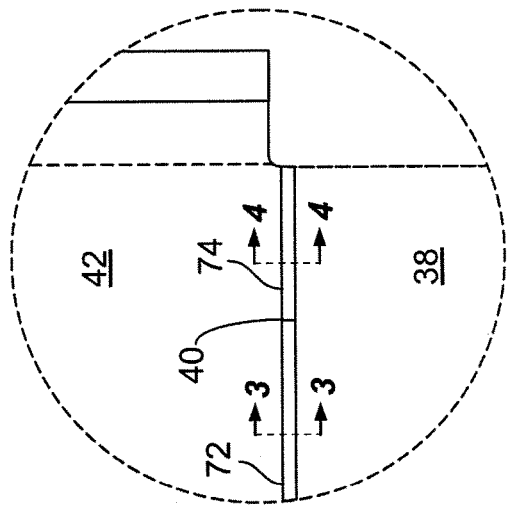

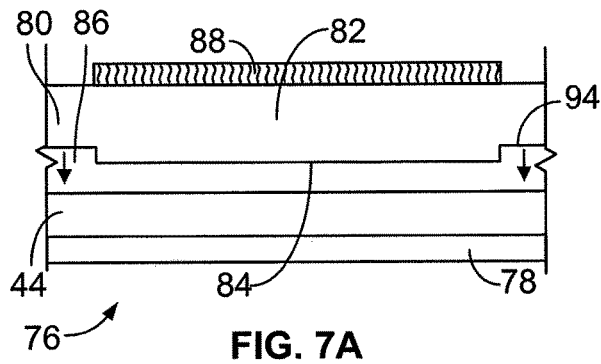# 
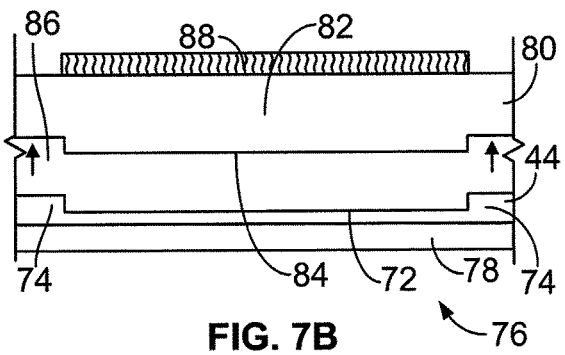
FIG. 7A  FIG. 7B
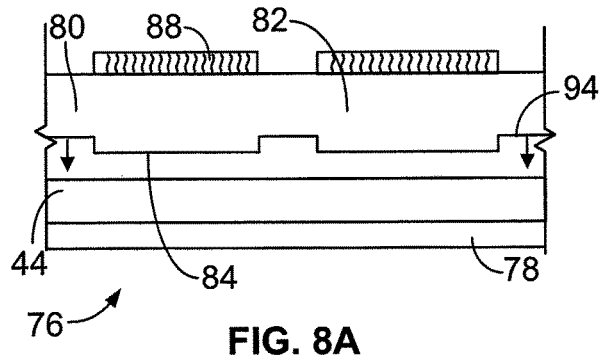
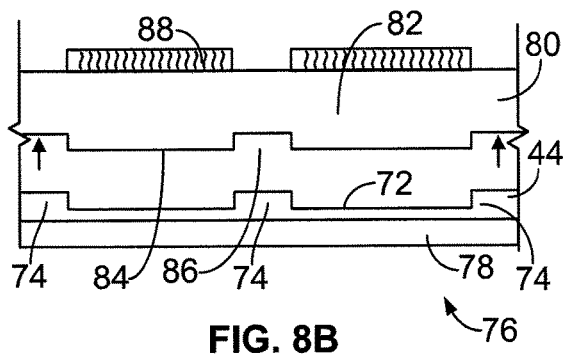
FIG. 8A  FIG. 8B
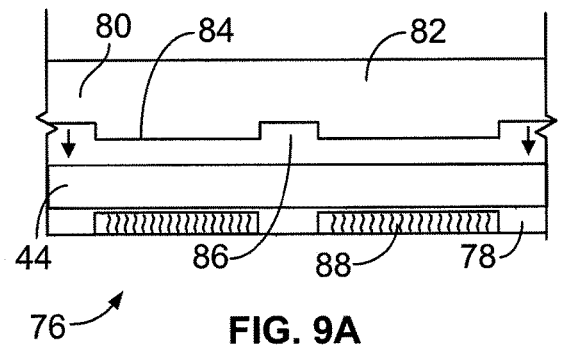
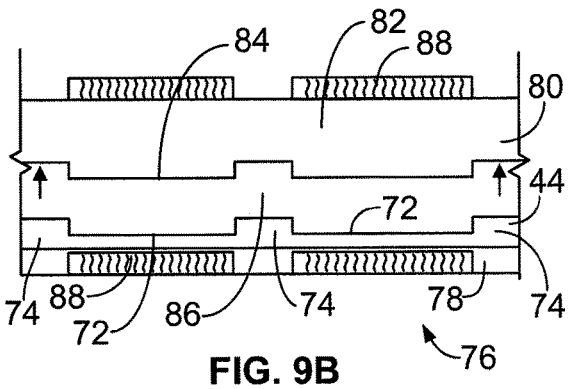
FIG. 9A  FIG. 9B
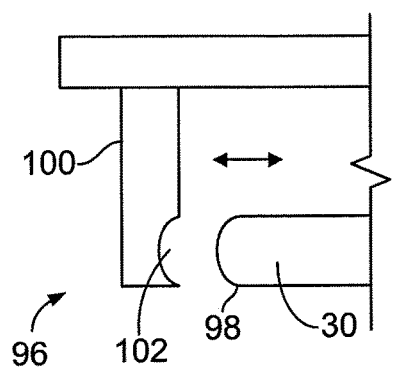
FIG. 10
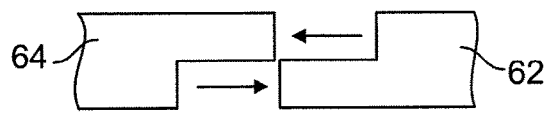
FIG. 11A
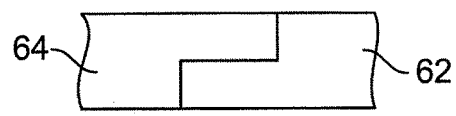
FIG. 11B

PLASTIC CORRUGATED CONTAINER WITH SEALED EDGES

CROSS-REFERENCE TO RELATED APPLICATIONS

The present Application is a continuation of U.S. patent application Ser. No. 14/265,977 filed Apr. 30, 2014, titled "Plastic Corrugated Container with Sealed Edges," which is a continuation of U.S. patent application Ser. No. 13/273,019 filed Oct. 13, 2011, now U.S. Pat. No. 8,864,017, titled "Plastic Corrugated Container with Improved Fold Lines and Method and Apparatus for Making Same," the contents of which are incorporated herein by reference.

FEDERALLY SPONSORED RESEARCH OR DEVELOPMENT

Not applicable.

FIELD OF THE INVENTION

The present invention generally relates to a reusable plastic corrugated container that is capable of being used interchangeably within and interchangeably with expendable corrugated containers in existing automated packaging equipment and to a method and apparatus for forming the container.

BACKGROUND OF THE INVENTION

Reusable plastic packaging has in recent years been used to store and transport all manner of goods and materials via air, highway, and rail. Such goods and materials run the gamut, including general merchandise, health and beauty aids, automotive parts, beverage, bakery, pharmaceuticals, and food products.

Reusable packaging typically lasts for multiple trips making it more cost effective than wood fiber corrugated or other disposable packaging, which is typically discarded after a single use. Plastic packaging is both reusable and recyclable, and therefore, environmentally friendly.

Until the present invention, one drawback to plastic packaging is that it cannot be used with existing automated corrugated paper packaging equipment. An example of such equipment is shown in U.S. Pat. No. 7,886,503 to Chase, et al. Such equipment is designed for new corrugated paper boxes. New paper corrugated boxes are almost perfectly straight and flat. Existing reusable plastic packaging such as plastic corrugated boxes, however, have top and bottom flaps that do not return to a sufficiently flat position after they have been used and broken down. Thus, existing plastic corrugated boxes will not work with automated corrugated paper packaging equipment to allow them to be reused.

The plastic corrugated container of the present invention provides a reusable plastic container that can be used interchangeably with existing automated paper corrugated packaging equipment. Fold lines for the top and bottom flaps include a combination of welded and scored portions that return the flaps to a substantially planar configuration with the container end and side panels after each use.

SUMMARY OF THE INVENTION

The present invention relates to a reusable corrugated plastic container in the form of a rectangular box. The container is formed from a flat blank of extruded plastic. The extruded plastic includes a first outer layer, a second outer layer and a plurality of flutes between the first outer layer and second outer layer. The blank is converted with fold lines between the side and end walls of the container with top and bottom flaps extending from the top and bottom portions of the side and end walls. These fold lines are designed to include both scored portions (i.e., partially crushed) and welded portions (e.g., heat welded). Prior to folding, the flaps are substantially coplanar with the respective side or end wall.

The welded portions of the fold line allow the top and bottom flaps to be easily folded in existing package erecting machines. The welded portions substantially keep their form over time. The scored portions also allow for folding of the flap, however, these portions also allow the memory of the plastic to recover over time to enable the flaps to again become coplanar with the respective side or end walls after use. This facilitates the reuse of the container after a first (or subsequent) use because the package erecting and packing machinery requires the containers to be straight.

In one embodiment of the present invention, a reusable plastic container is provided. The container includes a plastic container body having opposing side panels and opposing end panels. The container body also includes top side panel flaps attached to a top portion of each side panel, and bottom side panel flaps attached to a bottom portion of each side panel. The container body has top end panel flaps attached to a top portion of each end panel, and bottom end panel flaps attached to a bottom portion of each end panel. The top and bottom side panel flaps are each defined with respect to the side panels by a fold line. Each of the fold lines including at least one scored portion and at least one welded portion. Additional score and/or weld lines can be provided as desired or needed. Further other fold lines in the container can be formed in a similar manner, having both scored and welded portions in a single line.

In another embodiment, the present invention provides a blank for a reusable plastic container. The blank includes a first end panel having first and second ends and top and bottom portions, and a first side panel having first and second ends and top and bottom portions. The first end of the first side panel is attached to the second end of the first end panel. A second end panel has first and second ends and top and bottom portions. The first end of the second end panel is attached to the second end of the first side panel. A second side panel has first and second ends and top and bottom portions. The first end of the second side panel is attached to the second end of the second end panel. A top flap is attached along top flap fold lines to the top portion of each of the first and second end panels, and first and second side panels. A bottom flap is attached along bottom flap fold lines to the bottom portion of each of the first and second end panels, and first and second side panels. At least one of the top and bottom flap fold lines includes at least one welded portion and at least one scored portion. Again, additional scored and welded portions can be provided, and other fold lines in the blank can include a combination of scored and welded portions.

In a further embodiment, an apparatus for making a reusable plastic container from a blank is provided. The apparatus includes a bottom platen and a top platen. At least one of the top or bottom platens includes a rule for creating a fold line having at least one score forming portion for forming at least one scored portion of the fold line. The rule also has at least one weld forming portion for forming at least one welded portion of the fold line. A heating element is provided either against the weld forming portion of the rule, or on an opposing platen to provide heat for the weld in the fold line.

In another embodiment, a method for making a reusable plastic container is provided. The method includes the steps of providing a plastic corrugated blank, and creating a fold line in the blank. The step of creating the fold line includes scoring a first portion of the fold line and welding a second portion of the fold line.

In another embodiment, a fold line for a plastic corrugated container is provided. The fold line includes at least one scored portion, and at least one welded portion.

Additionally, the blank can be formed to have smooth outer edges. This can be accomplished after or part of an extruding process by pressing a generally C-shaped hot plate against the edges of the extruded sheet.

The blank can be provided with a connecting segment on either end of the blank having a reduced thickness. The connecting segments are used to connect the ends together for form a functional container. The connecting segment must be such that the partially broken down container would lay flat to be used with existing packaging equipment.

Other features and advantages of the invention will be apparent from the following specification taken in conjunction with the following Figures.

BRIEF DESCRIPTION OF THE FIGURES

To understand the present invention, it will now be described by way of example, with reference to the accompanying Figures in which:

FIG. 1 is a plan view of a plastic corrugated blank having fold lines of an embodiment of the present invention.

FIG. 2 is an enlarged view of section 2 of FIG. 1 showing the scored portion and welded portion of a fold line of an embodiment of the present invention.

FIG. 3 is a perspective view of a welded portion of a fold line of an embodiment of the present invention.

FIG. 4 is a perspective view of a scored portion of a fold line of an embodiment of the present invention.

FIG. 7A is a schematic view of an apparatus for making a plastic corrugated blank in accord with an embodiment of the present invention.

FIG. 7B is a schematic view of an apparatus for making a plastic corrugated blank in accord with an embodiment of the present invention.

FIG. 8A is a schematic view of an apparatus for making a plastic corrugated blank in accord with an embodiment of the present invention.

FIG. 8B is a schematic view of an apparatus for making a plastic corrugated blank in accord with an embodiment of the present invention.

FIG. 9A is a schematic view of an apparatus for making a plastic corrugated blank in accord with an embodiment of the present invention.

FIG. 9B is a schematic view of an apparatus for making a plastic corrugated blank in accord with an embodiment of the present invention.

FIG. 10 is a schematic view of an apparatus for making a plastic corrugated blank in accord with an embodiment of the present invention.

FIG. 11A is a schematic view of a tab and cutout in a plastic corrugated blank in accord with an embodiment of the present invention before engagement.

FIG. 11B is a schematic view of a tab and cutout in a plastic corrugated blank in accord with an embodiment of the present invention after engagement

DETAILED DESCRIPTION OF THE INVENTION

While this invention is susceptible of embodiments in many different forms, there is shown in the Figures, and will herein be described in detail, preferred embodiments of the invention with the understanding that the present disclosure is to be considered as an exemplification of the principles of the invention, and is not intended to limit the broad aspect of the invention to the embodiments illustrated.

Figure 5:
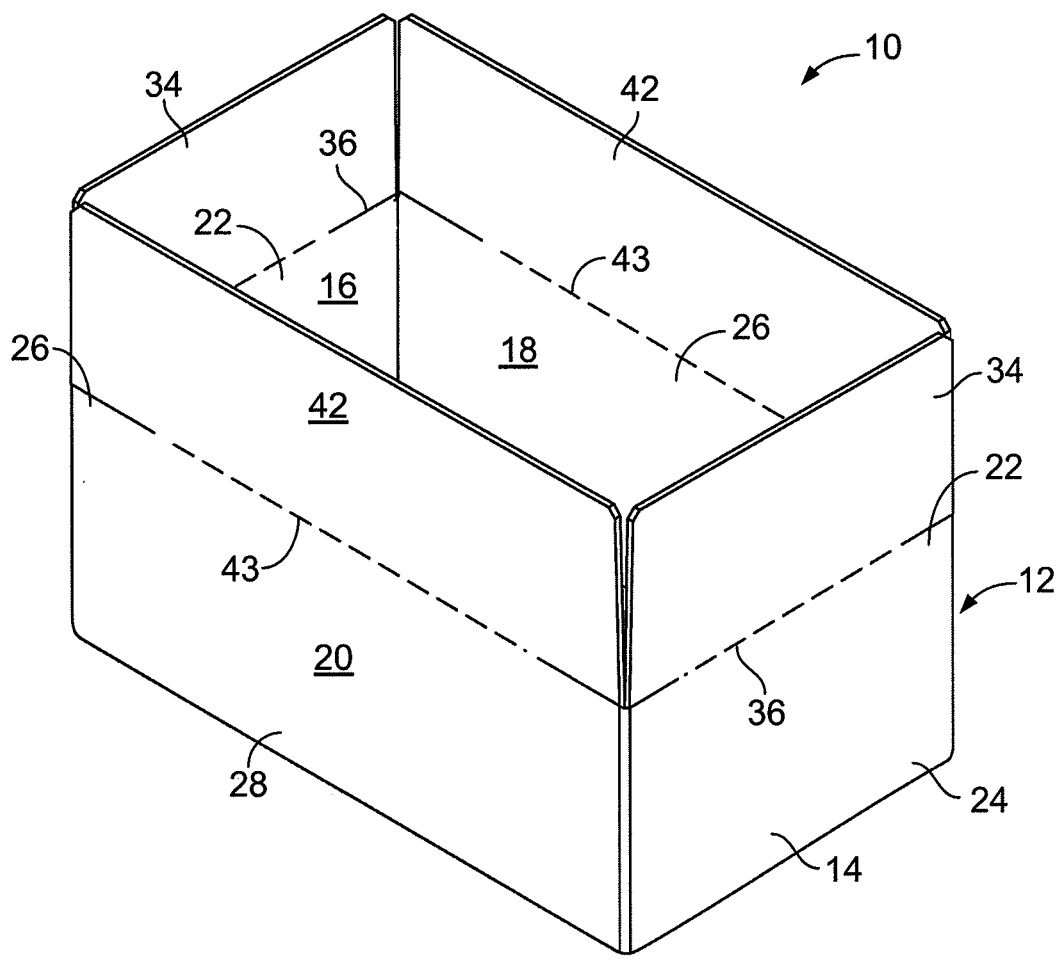
FIG. 5 is a partially erected plastic corrugated container of an embodiment of the present invention.

Referring to the drawings, in an embodiment of the present invention shown in FIG. 5, an erected and partially set up plastic corrugated box or container 10 is provided. The container 10 includes a container body 12 having a first end panel 14 and a second end panel 16, and a first side panel 18 and a second side panel 20. The first and second end panels 14 and 16 each have top portions 22 and bottom portions 24. The first and second side panels 18 and 20 also each have top portions 26 and bottom portions 28.

Bottom end panel flaps 30 are attached to the bottom portions 22 of the first and second end panels 14 and 16 along fold lines 32. Top end panel flaps 34 are attached to the top portions 22 of the first and second end panels 14 and 16 along fold lines 36. Bottom side panel flaps 38 are attached to the bottom portions 28 of the first and second side panels 18 and 20 along fold lines 40. Top side panel flaps 42 are attached to the top portions 26 of the first and second side panels 18 and 20 along fold lines 43.

The container 10 is formed from a plastic blank 44 shown in FIGS. 1 and 2. The blank 44 is an extruded sheet of plastic having a first layer 66 and a second layer 68, and a plurality of flutes 70 between them. (See FIGS. 3 and 4). The blank 44 includes the first end panel 14 having a first end 46 and a second end 48. The first side panel 18 has a first end 50 and a second end 52. The first end 50 of the first side panel 18 is attached to the second end 48 of the first end panel 14. The second end panel 16 has a first end 54 and a second end 56. The first end 54 of the second end panel 16 is attached to the second end 52 of the first side panel 18. The second side panel 20 includes a first end 58 and a second end 60.

The first end 58 of the second side panel 20 is attached to the second end 56 of the second end panel 16. In this pre-erected position, the bottom and top side and end panel flaps 30, 34, 38 and 42 are substantially planar with respect to their respective side and end panels 14, 16, 18 and 20. The bottom and top side and end panel flaps 30, 34, 38 and 42 are folded into an erected position to create the container 10. FIG. 5 shows a partially erected container 10 with the bottom side and end panel flaps 30 and 38 folded and the top side and end panel flaps 34 and 42 not yet folded. In a fully erected position, the top side and end panel flaps 34 and 42 are folded to enclose the container 10. After the container 10 is used, it is knocked down to a pre-erected (totally flat) or a partially broken down (one end of the blank still attached to the other end) position for transport and storage.

Figure 12:
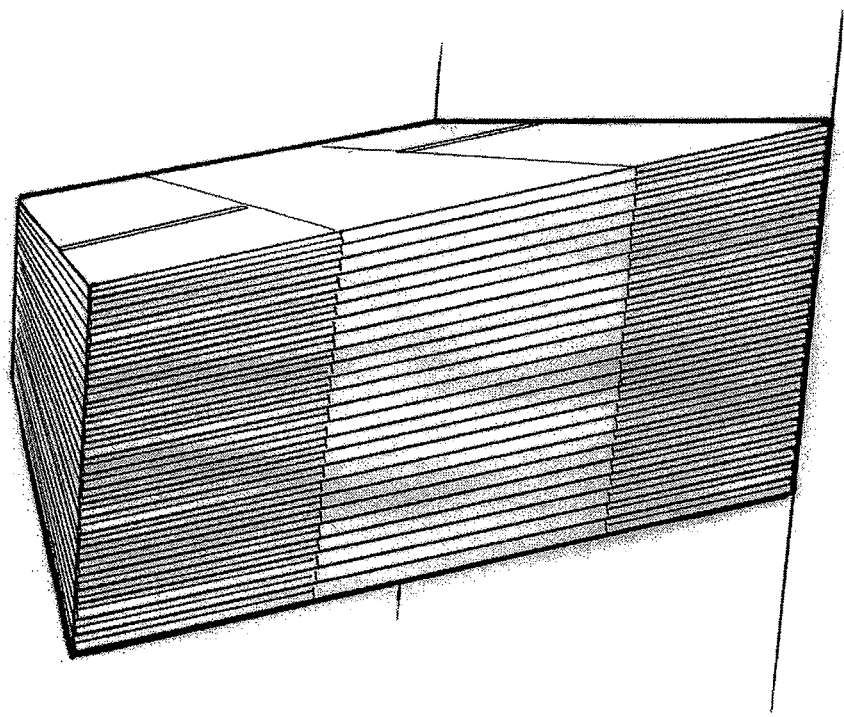
FIG. 12 is a perspective view of a stack of pre-erected containers for use with a packaging erector machine.

In one embodiment, a tab 62 is attached to the second end 56 of the second side panel 16. The tab 62 engages with a cutout 64 in the first end 46 of the first end panel 14. The tab 62 and cutout 64 are sized and shaped such that when engaged, as shown in FIGS. 11A and 11B, the tab 62 and cutout 64 form a connection between the first end panel 14 and second side panel 20 such that the panels are substantially coplanar as shown in FIG. 11B, and do not add thickness to the wall sections at this point. This becomes important when a large number of partially constructed or broken down containers are stacked (or positioned side by side) for a container erecting machine (See FIG. 12). Even a slight increase in thickness (above the double wall thickness of the remainder of the collapsed container) would result in a bulge in this area that could cause problems with the machinery.

In another embodiment, the tab or manufacturers joint flap 62 can be extruded to a thickness of approximately ⅓ the thickness of the second side panel 20. Where the tab or manufacturers joint flap 62 and side panel 20 overlap can be fastened, such as by gluing, and welded to a thickness equal to or less than the thickness of the side panel 20 to remove the memory from the plastic, and provide a container 10 with coplanar end and side panels. This does not add thickness allowing the container 10 to work with existing paper corrugated packaging machinery. This embodiment does not require a cutout 64. The tab or manufacturers joint flap 62 may extend the length of the second end 60 of the second end panel 20.

The blank 44 is preferably a corrugated plastic sheet. The blank 44 includes a first layer 66 and a second layer 68. Between the first layer 66 and second layer 68 are flutes 70. The blank 44 is formed as a single, integral sheet, preferably by an extrusion process. Plastic corrugated containers can be made to suit particular size, stiffness, resilience, and strength requirements by varying a variety of characteristics or parameters, such as the thickness of the first and second layers 66 and 68, the overall thickness of the blank 44, the number of flutes 70, the plastic resin used, or other characteristics of the blank 44 material. Typical ranges for such parameters include 67-100 flutes per foot, blank thickness of 2 to 10 mm, and plastic material density of 400 to 1,000 grams per square meter. Typical materials for the blank 44 can include plastic materials such as high density polypropylene and high density polyethylene.

Scored fold lines are known in the art and have been used extensively with paperboard containers such as cardboard. Scored fold lines are typically formed by crushing or partially crushing one or both sides of the blank along the desired fold line. This weakens the blank material so that it can be folded along such line. In addition, the crushed score line can include perforations at intervals along its length.

It has been found that given time, the score lines formed in plastic corrugated packaging in this manner have a memory, meaning the material has a tendency to return to its original pre-erected substantially planar position. Over time, typically on the order of days, the memory of the material essentially makes the score lines disappear, making folding the blank along these score lines a second time difficult if not impossible. The material is too stiff to be used in existing automated packaging equipment.

Figure 13:
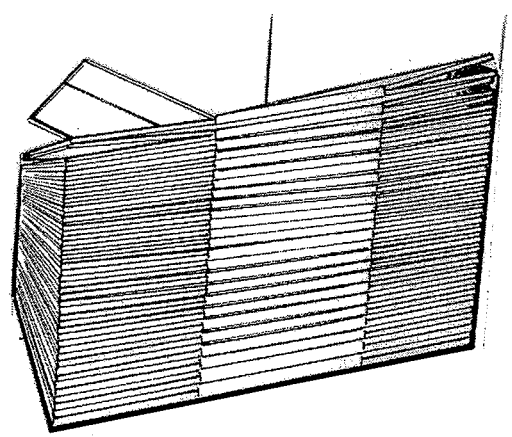
FIG. 13 is a perspective view of a stack of partially constructed and/or broken down containers for use with a packaging erector machine.

It has also been found that welding the first and second layers 66 and 68 of the blank 44 together allows for easy folding, but substantially negates the memory of the material. Welded score lines have not been previously used in connection with plastic corrugated packaging. Welding only (without providing a scored portion) may hinder the material from being used on existing corrugated paper packaging equipment as the top and bottom side and end panel flaps will not return to their pre-erected substantially planar configuration with the side and end panels (See FIG. 13).

To overcome this problem, a combination of welding and scoring the fold lines of the present invention is used. This provides the desired combination of ease of foldability and memory to permit the top and bottom side and end panel flaps to be folded and return to substantially their pre-erected planar configuration with the side and end panels after use and knock down. Thus, plastic packaging made in accord with the present invention can be reused and can be erected again using existing packaging equipment.

To this end, the fold lines 32, 26, 40 and 43 include at least one welded portion 72 (FIG. 3) and at least one scored portion 74 (FIG. 4). Additional welded portions 72 and/or scored portions 74 can be used for each fold line. In an embodiment shown in FIGS. 1, 2, 5 and 6, scored portions 74 are located at the first and second ends 50, 52, 58 and 60 of the side panels 18 and 20, and the first and second ends 46, 48, 54 and 56 of the end panels 14 and 16.

The scored portions 74 can be sized and spaced along the fold lines 32, 36, 40 and 43 to achieve desired foldability and memory characteristics such that the bottom and top end and side panel flaps 30, 34, 38 and 42 return to their substantially pre-erected position to allow it to be used with existing packaging equipment. The scored portions 74 can be crushed and may include perforations. The remainder of the fold lines 32, 36, 40 and 43 between the scored portions 74 include welded portions 72.

Figure 6:
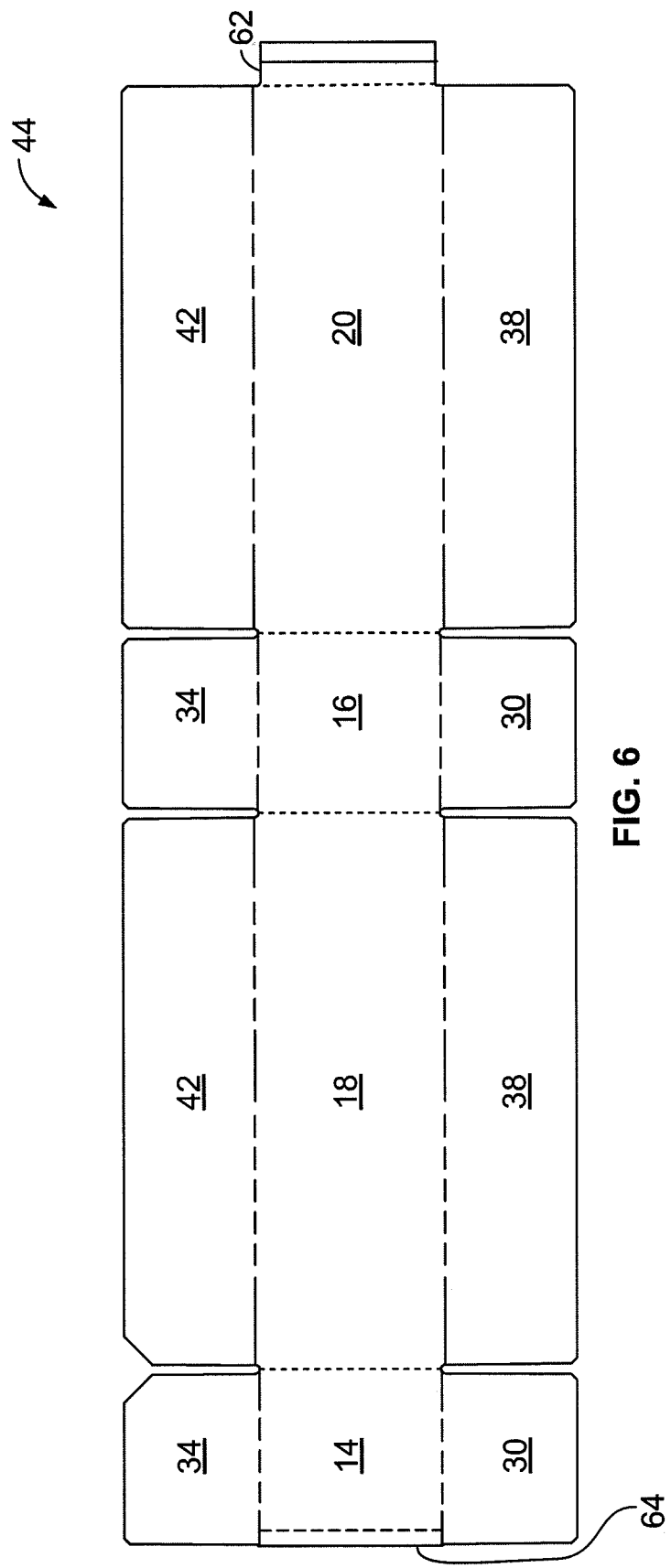
FIG. 6 is a plan view of a plastic corrugated blank having fold lines of an embodiment of the present invention.

As an example, in a plastic corrugated container 10 having dimensions 12 inches wide by 20 inches long by 8 inches high, and made of a material high density polypropylene, having a blank 44 thickness of 3-4 mm, and ninety flutes 70 per foot, it has been found that scored portions of approximately 1½ inches in length at the first and second ends 46, 48, 50, 52, 54, 56, 58 and 60 of the side and end panels 14, 16, 18 and 20 provides the desired characteristics. For longer side panels 18 and 20 as shown in FIG. 6, additional scored portions 74 can be located along the length of the fold lines 32, 36, 40 and 43. Alternatively, the scored portions 74 can be of longer or shorter length to achieve the same desired result. The same is true of the shorter end panels 14 and 16 of FIG. 6, wherein only one scored portion 74 may be desired or necessary.

The welded portion 72 and scored portion 74 are formed using an apparatus 76, which includes a bottom platen 78 and a top platen 80. In one embodiment shown in FIGS. 7A and 7B, the top platen 80 includes a rule 82. FIG. 7A shows the apparatus before fold lines 32, 36, 40 and 43 are formed in the blank 44. FIG. 7B shows the blank 44 are the fold lines are formed. The rule 82 includes a weld-forming portion 84 and score-forming portion 86. The score forming portion 86 is recessed with respect to the weld-forming portion 84.

For the welded portions 72 of the fold lines 32, 35, 40 and 43, the rule 82 is heated by a heating element or heater 88. The heater 88 heats the rule 82 to a temperature sufficient to form a welded portion 72 along the fold lines 32, 36, 40 and 43. This temperature will depend at least in part on the material used. Alternately, the bottom platen 78 can be heated at portions aligning with the weld-forming portions 84 of the rule 82 to the same effect. The rule 82 can include serrations in the score-forming portion 86.

In operation, the bottom platen 78 remains stationary while the top platen 80 is moved in a vertical direction. The blank 44 is placed between the bottom platen 78 and top platen 80. The top platen 80 including the rule 82 is lowered.

The rule 82 contacts the blank 44. The weld-forming portion 84 welds the first layer 66 of the blank 44 to the second layer 68. The score-forming portion 86, since it is recessed from the weld-forming portion 84, forms the scored portion 74 of the fold lines 32, 36, 40 and 43.

FIGS. 8A and 8B are similar to FIGS. 7A and 7B, but show an embodiment where scored portions 74 and welded portions 72 are formed alternately at selected desired intervals along the fold lines 32, 36, 40 and 43 as shown in the blank 44 of FIG. 6. This embodiment may be desirable where, for instance, the length of the side panels 18 and 20 and end panels 14 and 16 of the container 10 and blank 44 is such that the return strength of these panels is sufficient to return flaps 30, 24, 38 and 42 to substantially their pre-erected position.

FIG. 9A shows an embodiment where the bottom platen 78 rather than the top platen 80 is heated as shown in FIGS. 7A, 7B, 8A, and 8B. FIG. 9B shows an embodiment where both the top and bottom platens 78 and 80 are heated, including the rule 82.

FIG. 10 shows an apparatus 96 for sealing an end 98 of the bottom and top side and end flaps 30, 34, 38 and 42. Sealing is desirable in certain applications such as transport and storage of food items. Sealing prevents food materials from lodging in the interstices of the flutes 70, and bacteria from growing therein. The apparatus 96 includes a heated sealing bar 100 with a generally C-shaped section 102. The heated sealing bar 100 contacts the end 98 of a flap 30, 34, 38 or 42 and partially melts the end 98 to seal it and create a smooth arcuate surface. In the past, heat scoring was used to seal the edges. However, this produces a sharp edge that can be hazardous to those handling the containers.

While the specific embodiments have been illustrated and described, numerous modifications come to mind without significantly departing from the spirit of the invention and the scope of protection is only limited by the scope of the accompanying Claims.

I claim:

1. A blank for forming a reusable plastic container including a manufacturer's joint comprising:
   a multilayer corrugated plastic sheet having a first planar outer layer, a second planar outer layer and plurality of spaced apart ribs between the first planar outer layer and the second planar outer layer, the sheet having a first thickness, a first plurality of side panels connected together along fold lines, the plastic sheet has a first lateral edge having a second thickness and a second lateral edge opposed to the first lateral edge having a third thickness, the sheet is folded onto itself and a portion of the first lateral edge is connected to a portion of the second lateral edge along the manufacturer's joint to form a polygonal hoop where the combination of the second thickness and the third thickness is equal to the first thickness, the hoop is movable from a pre-erected condition where the hoop is flat, to an erected position where the first plurality of side panels define a chamber with openings at opposed ends into the chamber, the sheet also having a second plurality of end panels connected by hinges integral with the sheet to the first plurality of side panels, the second plurality of end panels are foldable from an open position where they are coplanar with the first plurality of side panels to a closed position where they seal the openings into the chamber, wherein the hinges have a memory to bias the second plurality of panels into a position coplanar with the first plurality of side panels, and wherein the hinges maintain their foldability after the container has been knocked down from the erected position into the pre-erected condition for reuse.

2. The blank of claim 1 wherein the container can be erected again from a used blank using packaging equipment.

3. The blank of claim 1 wherein the second plurality of end panels have a smooth outer edge.

4. The blank of claim 3 wherein the smooth outer edge is generally C-shaped.

5. The blank of claim 4 wherein the smooth outer edge is blunt.

6. The blank of claim 1 wherein the plastic sheet being formed by an extrusion process.

7. The blank of claim 1 wherein the plastic sheet has a density of 400 grams per square meter to 1,000 grams be square meter.

8. The blank of claim 7 wherein the blank is fabricated from high density polypropylene, or high density polyethylene.

9. The blank of claim 1 wherein a first portion of the hinges is scored.

10. The blank of claim 9 wherein a portion of the first portion has serrations.

11. The blank of claim 9 wherein the scored portion is crushed.

12. The blank of claim 9 further comprising a second portion of the hinges are welded.

13. The blank of claim 12 wherein the hinges further comprising a third portion and a fourth portion, the third portion being the same as the first portion and the fourth portion being the same as the second portion.

14. The blank of claim 1 wherein a portion of the hinges is welded.

15. The blank of claim 1 wherein the manufacturer's joint comprises an overlap of a tab extending from the first lateral edge with a cutout on the second lateral edge.

16. The blank of claim 15 wherein manufacturer's joint does not add thickness to the blank beyond the thickness of adjacent side panels and adjacent end panels.

17. The blank of claim 16 wherein the manufacturer's joint includes an adhesive.

18. The blank of claim 1 wherein the first lateral edge and the second lateral edge are extruded to a thickness of ⅓ that of the thickness of the side panels.

19. The blank of claim 1 wherein the multilayer blank has a first outer layer, a second outer layer and a core material between the first outer layer and the second outer layer.

* * * * *